E. W. LOCKWOOD.
Boxes for Assorting Peaches.

No. 136,252. Patented Feb. 25, 1873.

Witnesses:

Inventor:
E. W. Lockwood
per ——— Attorneys.

UNITED STATES PATENT OFFICE.

EDWARD W. LOCKWOOD, OF MIDDLETOWN, DELAWARE.

IMPROVEMENT IN BOXES FOR ASSORTING PEACHES.

Specification forming part of Letters Patent No. 136,252, dated February 25, 1873.

*To all whom it may concern:*

Be it known that I, EDWARD W. LOCKWOOD, of Middletown, in the county of New Castle and State of Delaware, have invented a new and useful Improvement in Box for Assorting Peaches, of which the following is a specification:

The invention consists in a box constructed so as to separate the leaves from the peaches, and allow them to be hand-picked as they are poured into the peach-baskets, all as hereinafter fully described and claimed.

Figure 1:
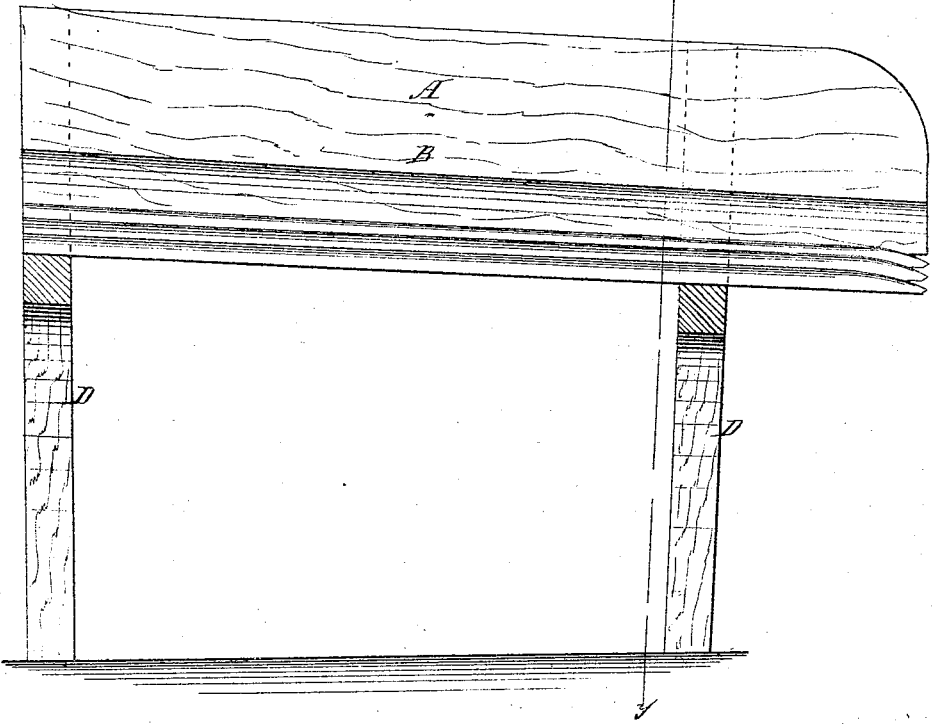
Figure 2:
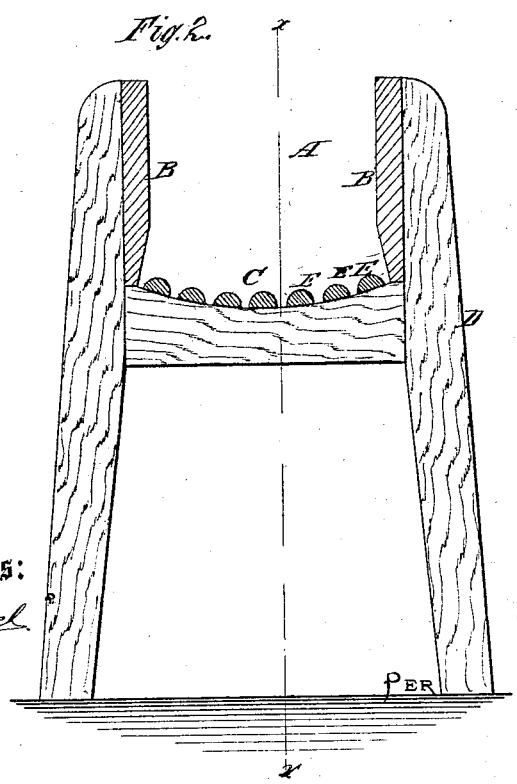

In the accompanying drawing, Figure 1 is a longitudinal vertical section of the device taken on the line $x\ x$ of Fig. 2. Fig. 2 is a vertical cross-section of Fig. 1 taken on the line $y\ y$.

Similar letters of reference indicate corresponding parts.

A is the box, consisting of two sides, B B, and an open slat bottom, C, supported by two frames, D, or in any other manner, at a convenient height from the ground. The box is placed so that the bottom is inclined longitudinally, and so that the peaches will have a tendency to roll from the upper to the lower end. The bottom C is made of rounded slats E, placed at about one inch, more or less, from each other. The peaches, consisting of good and bad together, with more or less leaves, are gathered in baskets and emptied into the upper end of the box. A person stands by the side of the box and picks out the defective peaches as they roll down the bottom, while the leaves pass through the bottom between the slats. The marketable peaches are caught in a basket at the other or lower end.

The box is made three or four feet in length, about half as wide, so that a basket of peaches will spread over the bottom and expose the defective ones and part with their leaves readily.

Peaches have usually been sorted at random on the ground, or in pouring one basket into another, and in a very imperfect manner. With this sorter the labor required is vastly lessened, and the work is performed in a much more satisfactory manner.

Having thus described my invention, I claim as new and desire to secure by Letters Patent—

The open box A B, provided with inclined bottom, formed of slats rounded on top, so that the peaches will roll down and allow a picker to remove the faulty fruit, while the leaves will pass through, as described.

EDWD. W. LOCKWOOD.

Witnesses:
ALEX. F. ROBERTS,
C. SEDGWICK.